United States Patent [19]

Nishimatsu et al.

[11] 4,288,837
[45] Sep. 8, 1981

[54] ELECTRICAL CAPACITOR

[76] Inventors: Mineaki Nishimatsu; Sadayoshi Mukai; Yoshinori Hayashi; Osamu Yamaguchi, all c/o Nissin Electric Co., Ltd., 47, Umezu Takase-cho, Ukyo-ku, Kyoto; Akira Ito, 8, Daimachi, Ichigaya, Shinjuku-ku, Tokyo; Yasutoshi Hara, 5-2, Utsugisaki, Nishikimachi, Iwaki, Fukushima, all of Japan

[21] Appl. No.: 59,953

[22] Filed: Jul. 23, 1979

Related U.S. Application Data

[63] Continuation of Ser. No. 871,691, Jan. 23, 1978, abandoned.

[30] Foreign Application Priority Data

Jan. 24, 1977 [JP] Japan .................................. 52-007169

[51] Int. Cl.³ .............................................. H01G 4/22
[52] U.S. Cl. .................................. 361/315; 252/567; 361/319; 361/327; 585/6.3; 428/318
[58] Field of Search .................. 361/315, 319, 327; 252/63

[56] References Cited

U.S. PATENT DOCUMENTS

| 1,667,214 | 4/1928 | Michel | 252/63 |
| 1,878,509 | 9/1932 | Michel | 252/63 |
| 3,163,705 | 12/1964 | Feick | 252/63 X |
| 3,640,868 | 2/1972 | Rocchini | 252/63 |
| 3,812,407 | 5/1974 | Nose | 361/315 |
| 4,054,937 | 10/1977 | Mandelcorn | 361/315 X |
| 4,068,286 | 1/1978 | Iijima | 361/315 |

Primary Examiner—Richard R. Kucia
Attorney, Agent, or Firm—Christensen, O'Connor, Johnson & Kindness

[57] ABSTRACT

An electrical capacitor comprising a capacitor element impregnated with a mixture of di-iso-propyl naphthalene and mono-iso-propyl naphthalene, the amount of which latter being 10% to 60% by weight, and preferably 20% to 40% by weight.

13 Claims, 10 Drawing Figures

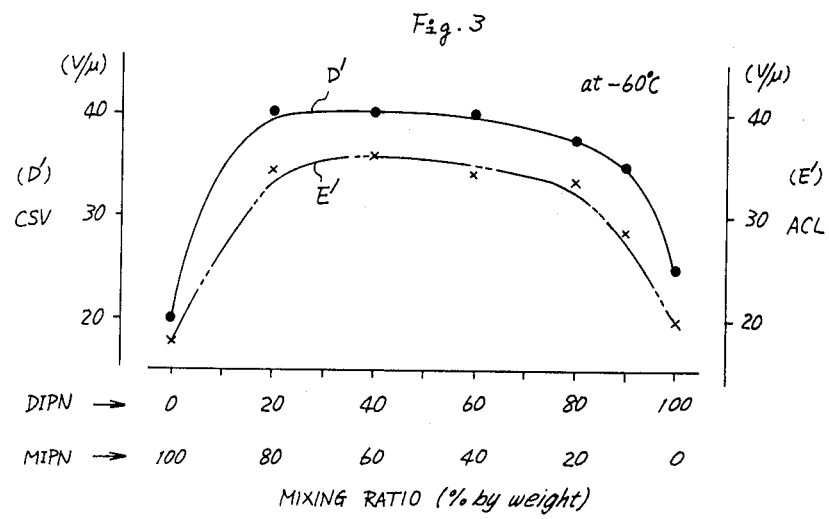
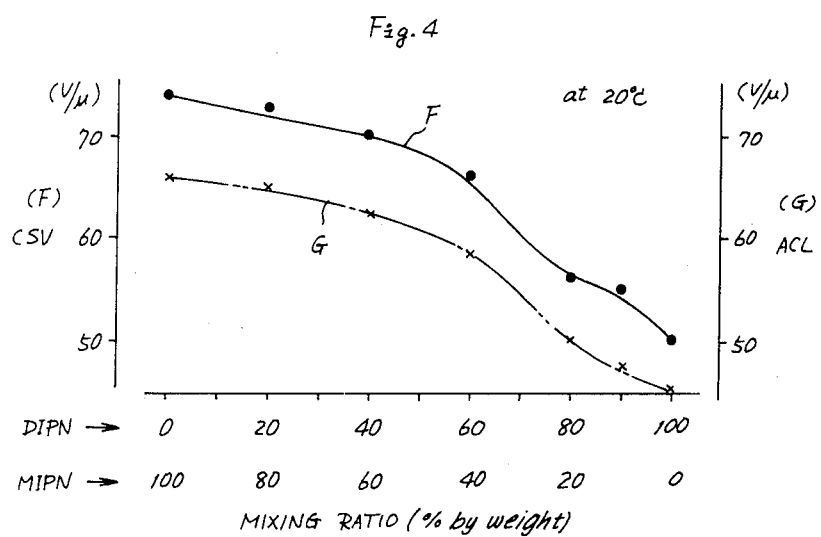

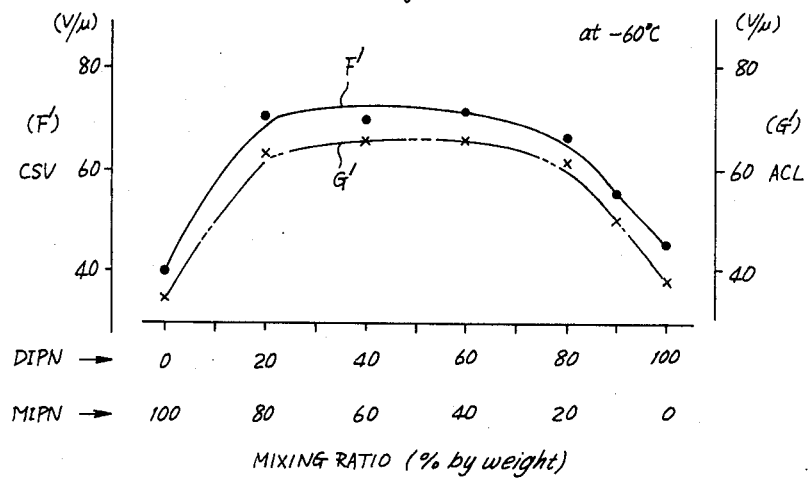
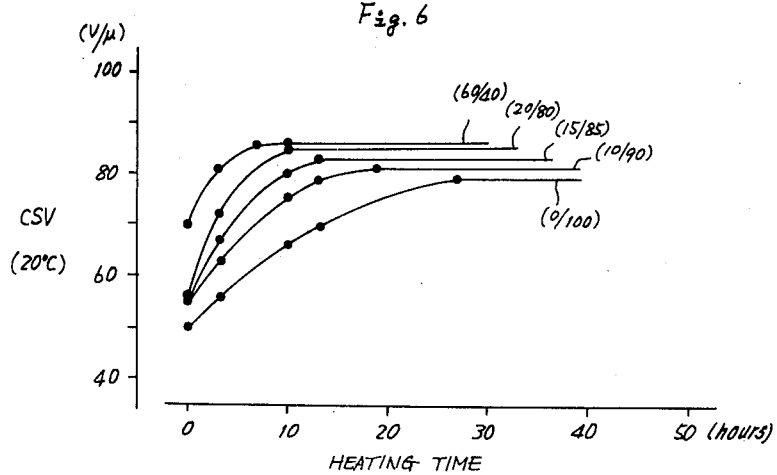

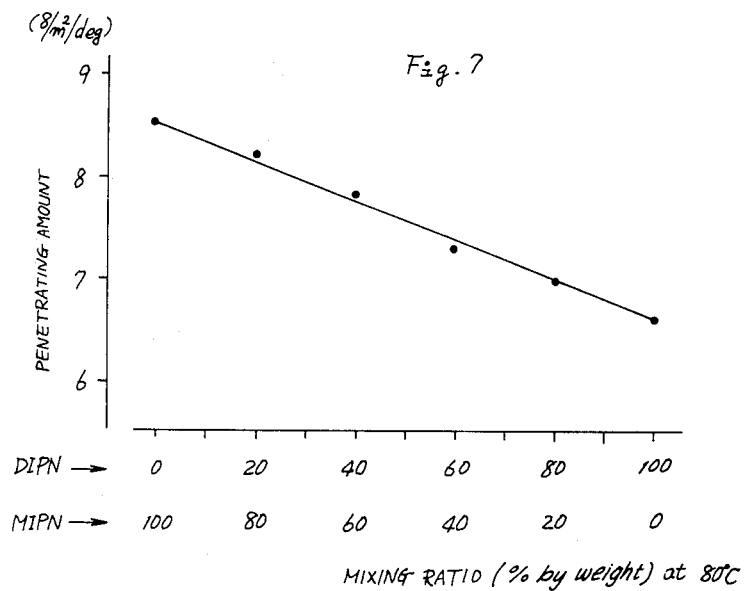
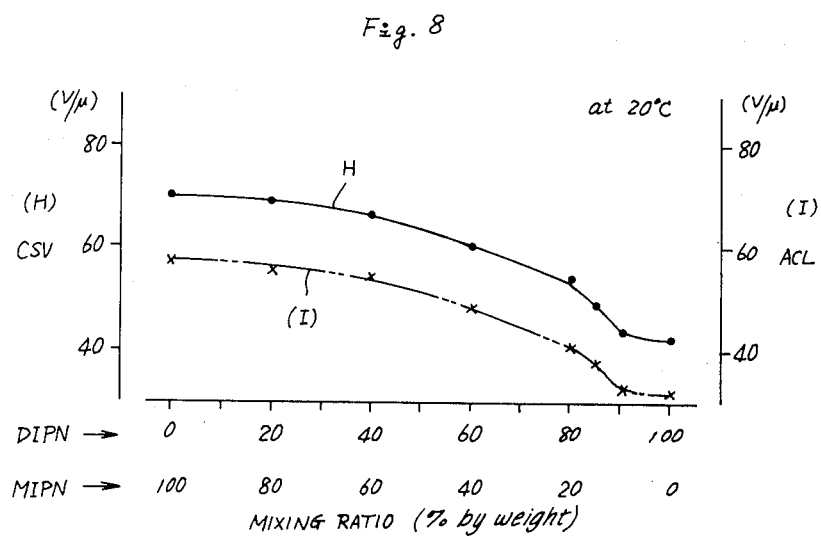

ELECTRICAL CAPACITOR

This is a continuation of application Ser. No. 871,691, filed Jan. 23, 1978 and now abandoned.

This invention relates to an electrical capacitor and more particularly to an electrical capacitor impregnated with insulating oil.

Mineral oil is well known and commonly used as an impregnant for electrical capacitors. In recent years, there has been an increasing demand for capacitors capable of withstanding higher voltages and yet of a compact size. Capacitors impregnated with mineral oil, however, cannot sufficiently meet the demand, so that there is a strong need for capacitors impregnated with an insulating oil which is superior to mineral oil in both electrical and physical properties.

Accordingly, the primary object of the invention is to provide an electrical capacitor which has improved electrical and physical characteristics.

Another object of the invention is to provide such an electrical capacitor as aforesaid which is capable of withstanding high voltage.

Another object of the invention is to provide such an electrical capacitor as aforesaid which can be used at low temperature without substantial reduction in its operating efficiency.

The insulating oil used to impregnate an electrical capacitor according to the invention is a mixture of di-iso-propyl naphthalene (which will be referred to as DIPN hereinafter) and mono-iso-propyl naphthalene (which will be referred to as MIPN hereinafter).

DIPN and MIPN used in the invention preferably are as pure as possible. However, the oils sometimes contain by-products such as mono-iso-propyl tetralin and di-iso-propyl tetralin produced in the synthesizing process thereof. It is not necessary to remove such impurities provided that they are less than 1% by weight since such a small amount of impurities would scarcely adversely affect the characteristics of the insulating oil.

The mixing ratio of DIPN and MIPN is such that MIPN is preferably 10% to 60% by weight and most preferably 20% to 40% by weight of the mixture. Any mixing ratio within the above range provides the best physical characteristics of the mixed oil as an insulating oil and the best electrical characteristics of the capacitor impregnated with the mixed oil, as will be described later in detail.

The invention will be described in detail with reference to the accompanying drawings, wherein:

FIG. 3 is a graphical illustration of the electrical characteristics at −60° C. of the capacitors of FIG. 2;

FIG. 4 is a graphical illustration of the electrical characteristics of capacitors having a capacitor element the dielectric of which comprises both insulating paper and plastic film impregnated with the mixed oil of FIG. 1;

FIG. 5 is a graphical illustration of the electrical characteristics at −60° C. of the capacitor of FIG. 4;

FIG. 6 is a graphical illustration of the relation between the CSV of a capacitor having a capacitor element the dielectric of which comprises both insulating paper and plastic film and the period of time spent in heating the capacitor for impregnation with the mixed oil of the invention;

FIG. 7 is a graphical illustration of the relation between the amount of the mixed oil that penetrates through polypropylene film and the mixing ratio of DIPN and MIPN;

FIG. 8 is a graphical illustration of the electrical characteristics at 20° C. of a capacitor having a capacitor element the dielectric of which comprises plastic film alone;

Prior to detailed description of some preferred embodiments of the invention, the physical and electrical characteristics of DIPN and MIPN are first given in the following table, wherein the characteristics of mineral oil are also given for comparision.

| Characteristics | | MIPN | DIPN | MINERAL OIL |
|---|---|---|---|---|
| Kinematic viscosity | at 30° C. | 3.3 | 9.3 | 12.0 |
| (cst) | at 75° C. | 1.4 | 2.6 | 3.4 |
| Dielectric constant (60 Hz) (80° C.) | | 2.5 | 2.5 | 2.2 |
| Dielectric loss tangent (%) (80° C.) | | 0.01 | 0.01 | 0.02 |
| Pour point (°C.) | | −30 | −47.5 | −30 |
| Visible gas generating voltage (kV/mm) | | 80 | 72 | 46 |

For measurement of the visible gas generating voltage in the above table capacitors are formed in the following manner. A sheet of insulating paper 55μ thick is wound 5 turns about a cylindrical brass electrode having a diameter of 25 mm and a length of 100 mm, and a sheet of aluminium foil 30 mm wide is wound on the insulating paper. The element thus formed is dried under vacuum and then impregnated with an insulating oil to be tested and left as it is for 24 hours. A 50 Hz voltage is then impressed on the aluminium foil at room temperature with the brass electrode being grounded and the impressed voltage is increased stepwise to such a level that gas visible to the naked eye is generated. The voltage level at which visible gas is generated is the visible gas generating voltage.

Figure 1:
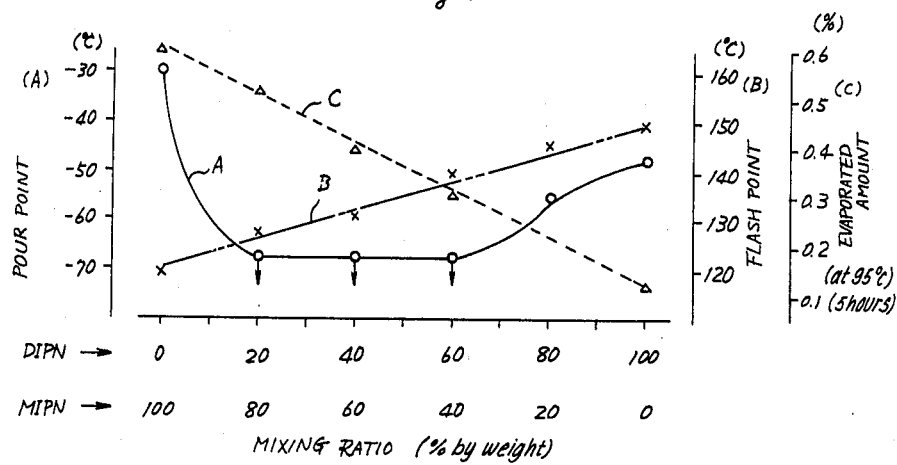
FIG. 1 is a graph of characteristic curves showing the relation between the mixing ratio of DIPN and MIPN and the pour point, the flash point and the evaporated amount of the mixed oil.

FIG. 1 shows the relation between the mixing ratio (expressed in % by weight) of DIPN and MIPN and the pour point, the flash point and the evaporated amount of the mixture of the two oils. The curves A, B and C represent the pour point, the flash point and the evaporated amount, respectively. In the curve A, the small circles from which a downwardly directed arrow depends indicate −67.5° C. only for convenience of illustration although the actual temperatures are lower than that.

As can be seen from the previous table, both DIPN and MIPN are superior to mineral oil in kinematic viscosity, dielectric constant and dielectric loss tangent. DIPN has a lower pour point than mineral oil and MIPN has the same pour point as mineral oil.

FIG. 1 shows that as the amount of MIPN to be mixed with DIPN is increased, the pour point of the mixture becomes lower and lower than the pour point of DIPN. However, when the amount of MIPN exceeds 80% by weight of the mixture, the pour point increases.

In the conventional manufacturing process of electrical capacitors the steps of drying and oil impregnation are carried out usually at as high temperature as 100° C. to 120° C. Therefore, the impregnating oil preferably has a higher flash point than 130° C. so as to prevent combustion thereof in the drying or oil impregnating step.

Prior to the oil impregnation of a capacitor, the impregnating oil is usually treated under vacuum at 50° C. to 120° C. so as to remove water or air from the oil. Therefore, the evaporated amount of the mixed oil must be as little as possible, preferably less than 0.4% by weight.

As shown in FIG. 1, if the amount of MIPN to be mixed with DIPN is less than 60% by weight, the flash point of the mixed oil is higher than 130° C. and the evaporated amount is less than 0.4% by weight. This means that the maximum amount of MIPN in the mixture should be 60% by weight. With respect to the pour point of the mixed oil, when MIPN is mixed with DIPN, the pour point of the mixed oil becomes lower than that of DIPN alone. As is clearly shown in FIG. 1, with 10% by weight of MIPN the pour point of the mixed oil lowers below −50° C. If the ratio of MIPN to be mixed with DIPN remains between 20% and 40% by weight, the mixed oil has a pour point lower than about −55° C., a flash point higher than about 138° C. and an evaporation rate lower than 0.3% by weight.

From the above observation it follows that the ratio of MIPN to be mixed with DIPN should preferably be from 10% to 60% by weight and most preferably from 20% to 40% by weight.

The electrical characteristics of a capacitor having a capacitor element impregnated with the above mixed oil of the invention will now be described. The capacitor element is made of five piled sheets of insulating paper each 18μ thick, 28 cm wide and 4 meters long and having a density of 0.8 g/cm³ and a pair of aluminium foils each 10μ thick, 25 cm wide and 3 meters long. The sheets of paper as the dielectric are sandwiched between the pair of aluminium foils as the electrodes. The stacked sheets and foils are wound into a cylindrical element, which is put in a casing. The capacitor element together with the enclosing casing is dried by heating under vacuum and then impregnated with the mixed oil in different mixing ratios of DIPN and MIPN.

Figure 2:
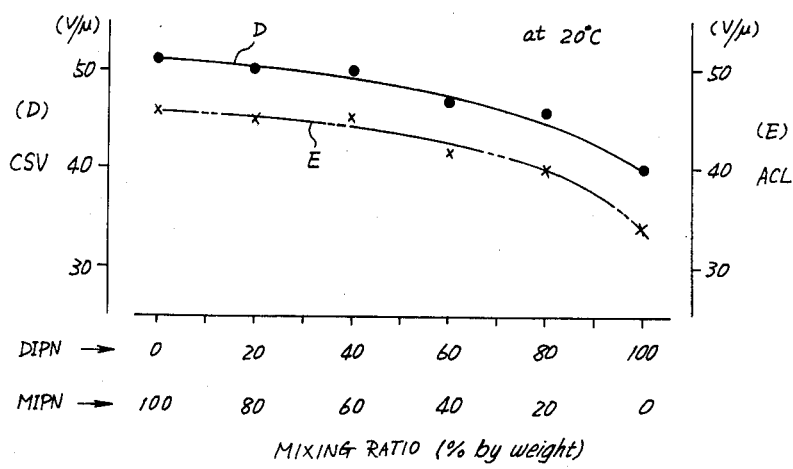
FIG. 2 is a graphical illustration of the electrical characteristics (the corona start voltage (which will be referred to as the CSV) and the long time withstand AC voltage (which will be referred to as ACL) at 20° C. of capacitors having a capacitor element the dielectric of which is insulating paper impregnated with the mixed oil in different mixing ratios.

FIG. 2 shows the relation between the corona start voltage (CSV) and the long time withstand AC voltage (ACL) of the capacitor formed in the above manner and the mixing ratio of MIPN and DIPN in the impregnating mixed oil. The curves D and E indicate the CSV and ACL, respectively. Long time withstand AC voltage or ACL is defined as the voltage which a capacitor has withstood for a period of $10^5$ seconds after impression of the voltage thereon without suffering from any disorder or breaking down.

FIG. 3 shows a CSV curve D' and an ACL curve E' obtained at −60° C. from the above capacitor impregnated with a mixture of MIPN and DIPN in different mixing ratios.

As is clearly seen from FIGS. 2 and 3, the CSV and ACL of the capacitor increase as the ratio of MIPN to be mixed with DIPN is increased. In FIG. 3, however, when the amount of MIPN exceeds 60% by weight, the CSV and ACL tend to decrease. As previously mentioned with reference to FIG. 1, if the ratio of MIPN to DIPN exceeds 60% by weight, the flash point of the mixed oil decreases below 130° C. and the evaporated amount increases above 0.4% by weight. Therefore, preferably the ratio of MIPN to be mixed with DIPN is within a range of from 10% to 60% by weight. For comparison, capacitors of the same construction as above impregnated with mineral oil have been tested at 20° C. The CSV is 35 V/μ and the ACL is 25 V/μ. Obviously the capacitor impregnated with the mixed oil of the invention is superior in ability to withstand voltage to the capacitor impregnated with conventional mineral oil.

Capacitors with a combination of insulating paper and plastic material used as the dielectric have been tested. The plastic material used is a sheet of polyolefin film 18μ thick, 28 cm wide and 4 meters long. The insulating paper used is 18μ thick, 28 cm wide and 4 meters long and has a density of 0.8 g/cm³. A single sheet of insulating paper is sandwiched between a pair of polyolefin film sheets, and on the outer side of each of the polyolefin film sheets an electrode comprising aluminium foil 10μ thick, 25 cm wide and 3 meters long is stacked. The sheets of insulating paper, polyolefin film and aluminium foil put together in the above manner are wound into a cylindrical capacitor element, which is enclosed in a casing. The assembly is then dried by heating under vacuum and the mixed oil of the invention is poured into the casing to impregnate the capacitor element therein.

FIG. 4 shows the CSV and ACL at 20° C. of the capacitors made in the above manner. Capacitors of the same construction as above have been heated at 70° C. for 10 hours. The CSV and ACL at −60° C. of those capacitors are given in the graph of FIG. 5. In FIGS. 4 and 5, F and F' indicate the CSV characteristic curves and G and G' indicate the ACL characteristic curves.

Capacitors of the same construction as mentioned above have been heated at 70° C. for different periods of time in order to test the effect of the degree of oil impregnation of the capacitor element. The relation between the CSV and the heating time is shown in FIG. 6, wherein the ratio in the parenthesis beside each of the five characteristic curves indicates the mixing ratio of MIPN to DIPN (MIPN/DIPN).

FIG. 7 shows the relation between the amount of the mixed oil that penetrates through biaxially oriented polypropylene film 18μ thick and the mixing ratio of MIPN and DIPN. The amount is measured in the following manner.

A polypropylene film sheet supported on a sheet of filter paper is placed at the bottom of a vessel containing the mixed oil. The vessel is put in an oven kept at 80° C. and held therein for a predetermined number of days. After that the film and the filter paper are taken out to measure the amount of the mixed oil that has penetrated through the film so as to be absorbed by the filter paper.

FIGS. 4 to 7 clearly show that also in the capacitor with a capacitor element comprising plastic film as at least a part of the dielectric material, as the ratio of MIPN to be mixed with DIPN is increased, the CSV and ASL of the capacitor impregnated with mixed oil increase, except in FIG. 5 wherein the CSV and ACL decrease when the amount of MIPN (the ratio of MIPN to DIPN) exceeds 60% by weight. It can be easily seen in view of the high ability of the mixed oil of the invention to penetrate through the plastic film that impregnation with the mixed oil increases the CSV and ACL of the capacitor.

A capacitor having a capacitor element of the same construction as above impregnated with conventional mineral oil has been tested. The CSV is 42 V/$\mu$ and the ACL is 35 V/$\mu$.

Comparison of these results indicates that the capacitor impregnated with the mixed oil of the invention is superior to the capacitor impregnated with mineral oil in ability to withstand or endure high voltage.

It is also seen from FIG. 6 that in the capacitor having a capacitor element which employs plastic film as at least a part of the dielectric material, heat treatment conducted after oil impregnation causes the capacitor element to be thoroughly impregnated with the mixed oil in a short period of time, with resulting further increase in the CSV of the capacitor. Therefore, in the capacitors of this type, too, DIPN and MIPN in the mixed oil are preferably so proportioned that the amount of MIPN is within the range of 10% to 60% by weight of the mixture, taking into consideration the previously mentioned flash point and the evaporated amount.

Figure 9:
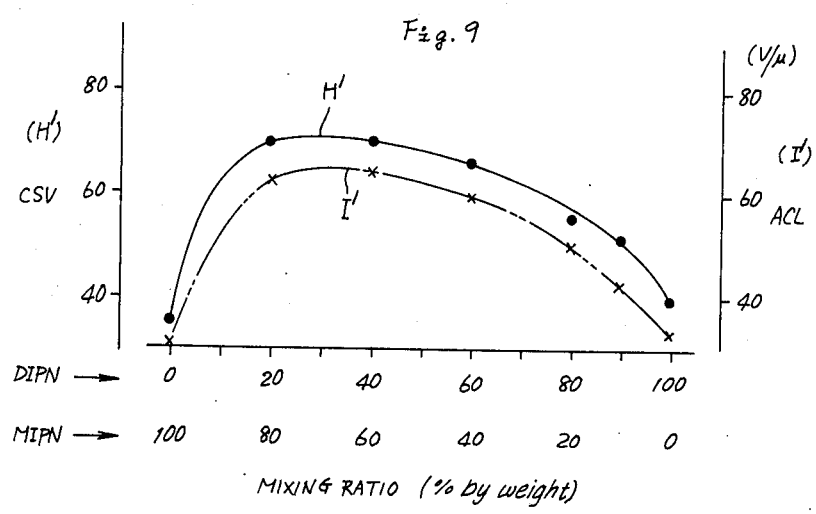
FIG. 9 is a graphical illustration of the electrical characteristics at −60° C. of the capacitor of FIG. 8.

Capacitors with a capacitor element employing plastic film only as the dielectric material have been tested. The plastic film used is a sheet of polypropylene film 18$\mu$ thick, 28 cm wide and 4 meters long. Three sheets of the plastic film are put together and sandwiched between a pair of electrodes made of aluminium foil 10$\mu$ thick, 25 cm wide and 3 meters long. The assembly of the electrodes and the dielectric is wound into a cylindrical capacitor element. The capacitor element is put in a casing and dried by heating under vacuum and then impregnated with the mixed oil of the invention. FIG. 8 shows the CSV and ACL at 20° C. of the capacitor. FIG. 9 shows the CSV and ACL at −60° C. of the capacitor of the same construction which has been heated at 70° C. for 10 hours. In FIGS. 8 and 9, H and H' indicate the CSV characteristic curves and I and I' indicate the ACL characteristic curves.

Figure 10:
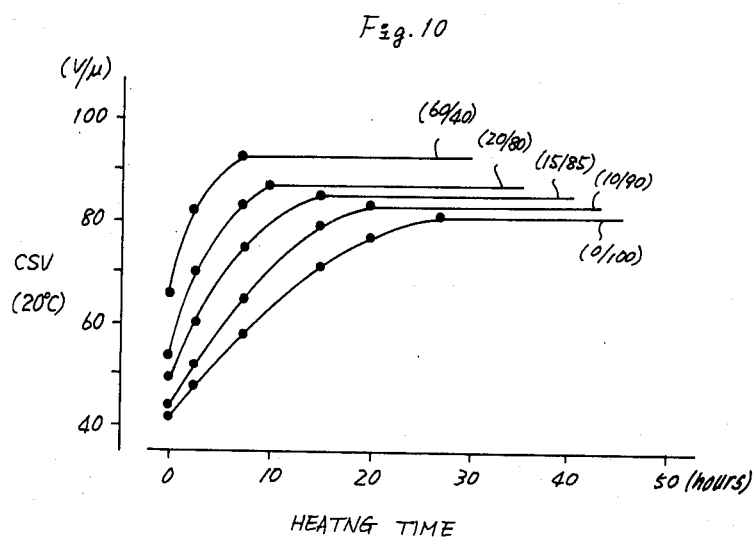
FIG. 10 is a graphical illustration of the relation between the CSV of a capacitor having a capacitor element the dielectric of which comprises plastic film alone and the period of time spent in heating the capacitor for impregnation with the mixed oil.

Capacitors of the same construction as above with a capacitor element impregnated with the mixed oil in a different mixing ratios of DIPN and MIPN have been heated at 70° C. for different periods of time in order to test the effect of the degree of oil impregnation on the capacitor element on the electrical characteristics of the capacitors. FIG. 10 shows the relation between the CSV of the capacitors and the length of the heating time. The ratio given in the parenthesis beside each of the five characteristic curves indicates the mixing ratio of MIPN to DIPN (MIPN/DIPN).

From FIGS. 8 to 10 it is apparent that in the capacitor with a capacitor element comprising plastic film only as the dielectric material, too, as the amount of MIPN to be mixed with DIPN is increased, the CSV and ASL of the capacitor become higher. From the fact that the mixed oil of the invention has a high ability to permeate the plastic film it can be easily seen that impregnation with the mixed oil helps increase the CSV and ACL of the capacitor. In FIG. 9, however, if the amount of MIPN in the mixture exceed 60% by weight, the CSV and ACL of the capacitor decrease.

A capacitor with a capacitor element of the same construction as above impregnated with conventional mineral oil has been tested. A CSV of 30 V/$\mu$ and an ACL of 21 V/$\mu$ have been observed.

Comparison of the results of the tests indicates that the mixed oil prepared in accordance with the invention is superior to mineral oil with respect to ability to withstand voltage. It is also seen from FIG. 10 that in the capacitor having a capacitor element comprising plastic film only as the dielectric material, heat treatment after oil impregnation causes the mixed oil to thoroughly impregnate the capacitor element, with resulting further increase in the CSV of the capacitor. Therefore, in the capacitor with the capacitor element of this type, too, DIPN and MIPN in the mixed oil preferably are so proportioned that the amount of MIPN is within the range of 10% to 60% by weight of the mixture, taking into consideration the previously mentioned flash point and the evaporated amount. In this type of capacitor element, however, the thermoplasticity of the plastic film used as the dielectric must be considered so that the various steps of the above-mentioned treatment are conducted at about 100° C. This allows selection of mixing ratios which effect lower flash points than that previously mentioned, and the mixed oil containing 10% to 90% by weight of MIPN may be used with the capacitor element comprising the plastic film only as the dielectric.

The invention has successfully improved the electrical characteristics of the capacitor impregnated with the mixed oil in comparison with conventional mineral oil. The capacitor has a high ability to withstand voltage and can be made compact in size. Especially the capacitor presents good characteristics at low temperatures and therefore is particularly suitable for use in cold areas.

The mixed oil of the invention also is superior in ability to penetrate through plastic film, so that plastic film can advantageously be used as the dielectric material of the capacitor element.

To improve the electrical characteristics of the mixed oil, a stabilizer of phenolic, amine, or epoxy type or a mixture thereof may be added to the mixed oil. In the capacitor having a capacitor element using plastic film as at least a part of the dielectric material, a voltage or a voltage and heat or pressure may be applied to the capacitor after oil impregnation so as to effect thorough impregnation of the dielectric with the mixed oil.

The surface of the plastic film and/or the electrode foil may be roughened for impregnation of the dielectric with more oil than otherwise.

What we claim is:

1. An electrical capacitor comprising a capacitor element impregnated with an impregnating oil consisting essentially of a mixture of di-iso-propyl naphthalene (DIPN) and mono-iso-propyl naphthalene (MIPN), said mono-iso-propyl naphthalene being 10% to 80% by weight of said mixture.

2. The capacitor of claim 1, wherein said mixture comprises 20% to 40% by weight of MIPN.

3. The capacitor of claim 1, wherein the dielectric of said capacitor element comprises insulating paper alone.

4. The capacitor of claim 1, wherein the dielectric of said capacitor element comprises insulating paper and plastic film.

5. The capacitor of claim 4, wherein said plastic film consists of at least one sheet.

6. The capacitor of claim 4, wherein said plastic film is composed of a member selected from the polyolefin group.

7. The capacitor of claim 5, wherein said plastic film is composed of a member selected from the polyolefin group.

8. The capacitor of claim 1, wherein the dielectric of said capacitor element comprises plastic film alone.

9. The capacitor of claim 8, wherein said plastic film is composed of a member selected from the polyolefin group.

10. The capacitor of claim 7, wherein said selected member is polypropylene.

11. The capacitor of claim 9, wherein said selected member is polypropylene.

12. The capacitor of claim 9, wherein said selected member is polypropylene.

13. An electrical capacitor for subfreezing environments comprising a capacitor element impregnated with an impregnating oil consisting essentially of a mixture of di-iso-propyl naphthalene and mono-iso-propyl naphthalene, said mono-iso-propyl naphthalene being from 10% to 80% by weight of said mixture.

* * * * *